(12) United States Patent
Rempel et al.

(10) Patent No.: US 7,345,115 B2
(45) Date of Patent: Mar. 18, 2008

(54) ORGANIC SOLVENT-FREE HYDROGENATION OF DIENE-BASED POLYMERS

(75) Inventors: Garry Llewellyn Rempel, Waterloo (CA); Qinmin Pan, Waterloo (CA); Jialong Wu, Kitchener (CA)

(73) Assignee: Lanxess Inc., Sarnia Ontario (CA)

( * ) Notice: Subject to any disclaimer, the term of this patent is extended or adjusted under 35 U.S.C. 154(b) by 0 days.

(21) Appl. No.: 11/371,400

(22) Filed: Mar. 9, 2006

(65) Prior Publication Data
US 2006/0211826 A1 Sep. 21, 2006

Related U.S. Application Data

(60) Provisional application No. 60/663,502, filed on Mar. 18, 2005.

(51) Int. Cl.
*C08C 19/02* (2006.01)
*C08F 8/04* (2006.01)

(52) U.S. Cl. ............ 525/338; 525/360; 525/340; 525/328.3; 525/329.3; 525/332.8; 525/333.1; 525/333.2

(58) Field of Classification Search ............ 525/338, 525/360, 340, 328.3, 329.3, 332.8, 333.1, 525/333.2
See application file for complete search history.

(56) References Cited

U.S. PATENT DOCUMENTS

| | | | | |
|---|---|---|---|---|
| 3,454,644 | A | * | 7/1969 | Dewhirst ............ 564/385 |
| 3,480,659 | A | * | 11/1969 | Dewhirst ............ 558/467 |
| 3,700,637 | A | * | 10/1972 | Finch, Jr. .......... 525/329.3 |
| 4,464,515 | A | * | 8/1984 | Rempel et al. ........ 525/338 |
| 4,631,315 | A | | 12/1986 | Buding et al. ........ 525/338 |
| 5,057,581 | A | | 10/1991 | Rempel et al. ........ 525/338 |
| 5,705,571 | A | | 1/1998 | Tsiang et al. ........ 525/338 |
| 6,020,439 | A | | 2/2000 | Ko et al. ............ 525/338 |
| 6,410,657 | B1 | | 6/2002 | Ko et al. ............ 525/338 |
| 6,696,518 | B1 | * | 2/2004 | Dersch et al. ........ 524/560 |

FOREIGN PATENT DOCUMENTS

| DE | 103 23 372 | | 12/2004 |
|---|---|---|---|
| GB | 1 558 491 | * | 1/1980 |
| GB | 2 070 023 | * | 9/1981 |
| JP | 2001-288212 | * | 10/2001 |
| WO | 99/28357 | | 6/1999 |
| WO | 00/73357 | | 12/2000 |

OTHER PUBLICATIONS

Mao et al., Journal of Molecular Catalysis A: Chemical, 135, 121-132(1998).*
Singha et al., Polym. Sci., 1, 181-185 (1994).*
Guo and Rempel in Journal of Molecular Catalysis (v 63, n 3, Dec. 15, 1990, p. 279-298) Catalytic hydrogenation of diene polymers Part I. Kinetic analysis and mechanistic studies on the hydrogenation of polybutadiene polymers in the presence of RhCl(PPh$_3$)$_3$.
Guo and Rempel in Journal of Molecular Catalysis (v 72, n 2 Mar. 1, 1992, p. 193-208) Catalytic hydrogenation of diene polymers Part II. Kinetic analysis and mechanistic studies on the hydrogenation of styrene-butadiene copolymers in the presence of RhCl(PPh$_3$)$_3$.
Mao and Rempel in Journal of Molecular Catalysis, A: Chemical, (v 135, n 2, Oct. 14, 1998, p. 121-132) "Catalytic hydrogenation of nitrile-butadiene copolymers by cationic rhodium complexes".
Charmondusit et al, in Journal of Applied Polymer Science (v 89, n 1, Jul. 5, 2003, p. 142-152) "Hydrogenation of *cis*-1,4-Poly(isoprene) Catalyzed by OsHCl(CO)(O$_2$)(PCy$_3$)$_2$".
Parent, McManus and Rempel in Industrial & Engineering Chemistry Research, (v 37, n 11, Nov. 1998, p. 4253-4261) "OsHCl(CO)(O$_2$)(PCy$_3$)$_2$-Catalyzed Hydrogenation of Acrylonitrile-Butadiene Copolymers".
Parent, McManus, and Rempel in Industrial & Engineering Chemistry Research (v 35 n 12, Dec. 1996, p. 4417-4423) RhCl(PPh$_3$)$_3$ and RhH(PPh$_3$)$_4$ Catalyzed Hydrogenation of Acrylonitrile-Butadiene copolymers.
Pan and Rempel in Macromolecular Rapid Communications (v 25, Apr. 2004, p. 843-847) "Hydrogenation of Styrene-Butadiene Rubber Catalyzed by Ru(CH=CHPh)Cl(CO)(PCy$_3$)$_2$".
Gilliom in Macromolecules v 22, n 2, Feb. 1989, p. 662-665 "Catalytic Hydrogenation of Polymers In the Bulk".
Gilliom in Macromolecules v 25, n 22, Oct. 1993 p. 6066-6068 "Observation of a Reaction Front in The Bulk Catalytic Hydrogenation of a Polyolefin".

* cited by examiner

*Primary Examiner*—Ling-Sui Choi
(74) *Attorney, Agent, or Firm*—Jennifer R. Seng

(57) ABSTRACT

A process is provided for the hydrogenation of carbon-carbon double bonds in polymers by treatment of the polymers with hydrogen in the presence of rhodium-based catalysts and in the complete absence of organic solvent.

11 Claims, No Drawings

ORGANIC SOLVENT-FREE HYDROGENATION OF DIENE-BASED POLYMERS

This application claims the benefit of U.S. Provisional Application Ser. No. 60/663,502 filed Mar. 18, 2005 and Canadian Patent Serial No. 2,501,199.

FIELD OF THE INVENTION

The present invention relates to a process for the hydrogenation of carbon-carbon double bonds in polymers.

BACKGROUND OF THE INVENTION

It has been known that carbon-carbon double bonds in polymers may be successfully hydrogenated by treating the polymer in an organic solution form with hydrogen in the presence of a catalyst. Such processes can be selective toward the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations, including catalysts based on cobalt, nickel, rhodium, osmium and ruthenium. The suitability of the catalyst depends on the extent of hydrogenation required, the rate of the hydrogenation reaction and the presence or absence of other groups, such as carboxyl and nitrile groups, in the polymers.

U.S. Pat. No. 6,410,657 teaches a method for the selective hydrogenation of the unsaturated double bonds in conjugated diene units of a homopolymer or copolymer in the presence of a homogeneous organotitanium-based catalyst. It demonstrates a high degree of hydrogenation and hydrogenation reproducibility using a catalyst mixture consisting of a substituted or unsubstituted monocyclopentadienyl titanium compound and lithium hydride derived from a reaction of both alkyl lithium and hydrogen in solution.

U.S. Pat. No. 6,020,439 demonstrates a method for hydrogenating living polymers that include mainly conjugated double bond monomers and aromatic vinyl monomers. The polymer made by at least one conjugated diene compound is contacted with hydrogen in the presence of a catalyst. The catalyst is formed from a cyclopentadienyl titanium compound. A cocatalyst is provided in the form of alkoxylithium compound. This catalyst system selectively hydrogenates the unsaturated double bonds in the conjugated diene units of the living polymer in solution.

U.S. Pat. No. 5,705,571 provides a process for selective hydrogenation of a conjugated diene polymer. The process includes bringing the conjugated diene polymer in an inert organic solvent into contact with hydrogen in the presence of a hydrogenation catalyst combination including a substituted or unsubstituted bis(cyclopentadienyl) Group VIII transition metal compound and an organic lithium compound. It claims that the hydrogenation can be carried out in the presence of a small amount of the hydrogenation catalyst combination under mild conditions, and both the hydrogenation conversion and selectivity to conjugated diene units are high.

U.S. Pat. No. 5,057,581 teaches a selective hydrogenation method of the carbon-carbon double bonds of conjugated diene copolymers in homogeneous solution in an organic solvent in the presence of certain divalent ruthenium carbonyl complex catalysts containing phosphine ligands having bulky alkyl substituents.

U.S. Pat. No. 3,454,644 teaches the hydrogenation in solution of unsaturated organic compounds having from 2 to 20 carbon atoms which organic compounds contain at least one moiety selected from keto, formyl, nitrile, nonaromatic carbon double bonds and carbon-carbon triple bonds, by using as the catalyst a metal complex of ruthenium or osmium bonded to two electro negative species selected from hydrogen and halogen and complexed with at least two organic stabilizing ligands such as carbonyl or tertiary phosphine.

Guo and Rempel in Journal of Molecular Catalysis (v 63, n 3, Dec. 15, 1990, p 279-298; v 72, n 2, Mar. 1, 1992, p 193-208) describe the hydrogenation of poly cis-1,4-polybutadiene and styrene-butadiene copolymer in the presence of $RhCl(PPh_3)_3$ in solution under mild reaction conditions. Quantitative hydrogenation of carbon-carbon unsaturation can be achieved without any large scale changes in polymer chain length properties.

Mao, and Rempel in Journal of Molecular Catalysis, A: Chemical, (v 135, n 2, Oct. 14, 1998, p 121-132) teaches hydrogenation of nitrile-butadiene copolymers catalyzed in monochlorobenzene by a series of cationic rhodium complexes $[Rh(diene)(L_2)]^+$ (diene=norbornadiene (NBD) and 1,5-cyclooctadiene (COD); $L_2=(PPh_3)_2$, $Ph_2P(CH_2)_nPPh_2$ (n=2, 3 and 4); $Cy_2P(CH_2)_2PCy_2$).

Charmondusit et al, in Journal of Applied Polymer Science (v 89, n 1, Jul. 5, 2003, p 142-152) describes quantitative homogeneous hydrogenation of cis-1,4-poly-(isoprene) (CPIP) in the presence of $OsHCl(CO)(O_2)(PCy_3)_2$ as catalyst over the temperature range of 115-140° C. in solution.

Parent, McManus, and Rempel in Industrial & Engineering Chemistry Research, (v 37, n 11, November, 1998, p 4253-4261) describes the selective hydrogenation of olefin within acrylonitrile-butadiene copolymers by homogeneous catalyst precursor, $OsHCl(CO)(L)(PCy_3)_2$ (1, L=vacant; 2, L=$O_2$) in solution. Reversible coordination of nitrile to complex 1 not only reduces the hydrogenation rate but creates an unprecedented sensitivity of the process to pressure. Unique to this system is an apparent second-order dependence of the hydrogenation rate on $[H_2]$, which diminishes toward zero order as pressures exceed 60 bar.

Parent, McManus, and Rempel, in Industrial & Engineering Chemistry Research (v 35, n 12, December, 1996, p 4417-4423) describes homogeneous catalyst precursors of the forms $RhCl(PPh_3)_3$ and $RhH(PPh_3)_4$ for the selective hydrogenation of acrylonitrile-butadiene copolymers in solution. The kinetic results suggest the behavior observed under severe conditions is consistent with that reported for pressures and temperatures near ambient. Dilute solution viscosity data are used to demonstrate the uniform selectivity of both $RhCl(PPh_3)_3$ and $RhH(PPh_3)_4$ catalyzed hydrogenations.

Pan and Rempel in Macromolecular Rapid Communications (v 25, April, 2004, p 843-847) describe an efficient hydrogenation of butadiene-styrene copolymers in solution using a ruthenium complex.

Gilliom in *Macromolecules* (v 22, n 2, February, 1989, p 662-665; v25, no. 22, October, 1992, p6066-6068) discloses bulk hydrogenation of polymers using entrapped catalyst ($(Rh(PPh_3)_3Cl$ or $[Ir(COD)(PMePh_2)_2]PF_6$) introduced via organic solution followed by solvent removal. High conversion (90 percent) was obtained at moderate temperatures and pressures, however the reaction rate was very slow.

In summary, the research in this area, namely, the hydrogenation of diene-based polymers, has been very successful if the polymers were dissolved in an organic solvent. However, there is no research on hydrogenation of diene-based polymers without using organic solvents, except Gilliom's research, in which the reaction rate was very slow but it was still necessary to use an organic solvent to introduce the catalyst into the polymer. The present invention is directed to a process wherein selective bulk hydrogenation of diene-based polymers is performed without the need or use of any organic solvent at any stage, and a high degree of hydrogenation is achieved and the rate of hydrogenation is high.

SUMMARY OF THE INVENTION

The present invention provides an organic solvent free process for the hydrogenation of carbon-carbon double bonds in diene-polymer or polymer containing a conjugated diolefin and at least one other copolymerizable monomer.

The process of the present invention includes hydrogenating the carbon-carbon double bonds in diene based polymers or polymers containing a conjugated diolefin and at least one other copolymerizable monomer at a temperature of from about 35° C. to about 250° C. and a hydrogen pressure of from about 0.1 to about 20 MPa in the presence of a catalyst having the formula:

$$RhQL_x$$

wherein Q is hydrogen or an anion, preferably a halide and more preferably a chloride or bromide ion wherein L is a ligand compound of the formula $R_mB$ or $R_mB(CH_2)_nBR_m$, wherein R is a $C_1$-$C_8$-alkyl group, a $C_4$-$C_8$-cycloalkyl group, a $C_6$-$C_{15}$-aryl group or a $C_7$-$C_{15}$-arylalkyl group, B is phosphorus, arsenic, sulfur, or a sulphoxide group, preferably B is phosphorus and m is 2 or 3, n is 2, 3 or 4, and wherein x is 2, 3 or 4, preferably x is 3 when Q is halogen and preferably x is 4 when Q is hydrogen.

DETAILED DESCRIPTION

The process of the present invention includes polymers which contain carbon-carbon double bonds. Polymers having carbon-carbon double bonds useful in the present invention include conjugated diene, homo-polymers or polymers of a conjugated diene and at least one other copolymerizable monomer.

Suitable conjugated dienes include butadiene, isoprene, piperylene and 2,3-dimethylbutadiene, with butadiene and isoprene being preferred and butadiene being most preferred.

Suitable copolymerizable monomers include acrylonitrile, methacrylonitrile, styrene, alphamethyl styrene, propyl acrylate, butyl acrylate, propyl methacrylate, butyl methacrylate, and unsaturated carboxylic acids selected from fumaric acid, maleic acid, acrylic acid and methacrylic acid.

According to the present invention, the conjugated diene forms from about 15 to about 100% by weight of the carbon-carbon double bond containing polymer. If other copolymerizable monomers are used and selected from styrene and alphamethyl styrene, the styrene and/or a methyl styrene monomer preferably forms from about 15 to about 60% by weight of the polymer. If the other copolymerizable monomers are used and selected from acrylonitrile and methacrylonitrile, the acrylonitrile and/or methacrylonitrile monomer preferably forms from about 15 to about 50% by weight of the polymer, with the conjugated diolefin forming from about 50 to about 85% by weight of the polymer.

If other copolymerizable monomers are used and selected from acrylonitrile and methacrylonitrile and additionally from an unsaturated carboxylic acid, the acrylonitrile or methacrylonitrile forms from about 15 to about 50% by weight of the polymer, the unsaturated carboxylic acid forms from about 1 to about 10% by weight of the polymer and the conjugated diolefin forms from about 40 to about 85% by weight of the polymer.

Preferred polymers include styrene-butadiene polymers of the random or block types, butadiene-acrylonitrile polymers and butadiene-acrylonitrile-methacrylic acid polymers. Preferred butadiene-acrylonitrile polymers have an acrylonitrile content of from about 25 to about 45% by weight.

Polymers useful in the process of the present invention are high molecular weight materials and have molecular weights, as expressed by the Mooney viscosity (ML1+4 at 100° C.), of from about 25 to about 70. A polymer having a Mooney viscosity of about 34 has an intrinsic viscosity, determined in chlorobenzene at 35° C., of about 1.1 dL/g.

The hydrogenation of the polymer can be undertaken in bulk form, and the use of organic solvent which is conventional in hydrogenation operations is completely eliminated. The polymers to be hydrogenated according to the present invention can be in the form of particles or thin films. There is no restricting requirement for the particle size or the thickness of the films. However, the smaller the particle size or the thinner the film is, the quicker the hydrogenation; and generally the particle size or thickness of the films is less than 10 mm, preferably less than 2 mm, in diameter.

The hydrogenation process of the present invention can be achieved with use of a rhodium containing catalyst. Preferably the catalyst is of the formula:

$$RhQL_x$$

wherein Q is hydrogen or an anion, preferably a halide and more preferably a chloride or bromide ion wherein L is a ligand compound of the formula $R_mB$ or $R_mB(CH_2)_nBR_m$, wherein R is a $C_1$-$C_8$-alkyl group, a $C_4$-$C_8$-cycloalkyl group, a $C_6$-$C_{15}$-aryl group or a $C_7$-$C_{15}$-arylalkyl group, B is phosphorus, arsenic, sulfur, or a sulphoxide group, preferably B is phosphorus and m is 2 or 3, n is 2, 3, or 4 and wherein x is 2, 3 or 4, preferably x is 3 when Q is halogen and preferably x is 4 when Q is hydrogen.

Preferred catalysts include tris-(triphenylphosphine)-rhodium(I)-chloride of formula $[(C_6H_5)_3P]_3RhCl$, tris(triphenylphosphine)-rhodium(III)-chloride of formula $RhCl_3[P(C_6H_5)_3]_3$, tris-(dimethylsulphoxide)-rhodium(III)-chloride of formula $RhCl_3[(CH_3)_2SO]_3$ and tetrakis-(triphenylphosphine)-rhodium hydride of formula $((C_6H_5)_3P)_4RhH$, and the corresponding compounds in which triphenylphosphine moieties are replaced by other phosphine moieties such as tricyclohexylphosphine. The catalyst can be used in small quantities. An amount in the range of 0.01 to 5.0% preferably 0.02% to 2.0% by weight based on the weight of the polymer.

The catalyst can be used with a co-catalyst that is a ligand of formula $R_mB$, where R, m and B are as defined above, and m is preferably 3. Preferably B is phosphorus, and the R groups can be the same or different. The R group of the catalyst may be a triaryl, trialkyl, tricycloalkyl, diaryl monoalkyl, dialkyl monoaryl, diaryl monocycloalkyl, dialkyl monocycloalkyl, dicycloalkyl monoaryl or dicycloalkyl monoaryl. Examples of suitable co-catalyst ligands are given in U.S. Pat. No. 4,631,315, the disclosure of which is incorporated by reference. The preferred co-catalyst ligand is triphenylphosphine. The co-catalyst ligand is preferably used in an amount in the range 0 to 5000%, more preferably 500 to 3000% by weight, based on the weight of catalyst. Preferably also the weight ratio of the co-catalyst to the rhodium-containing catalyst compound is in the range 0 to 50, more preferably in the range 5 to 30.

The hydrogenation process of the present invention is preferably carried out with essentially pure hydrogen gas at a pressure of from about 0.1 to about 20 MPa, preferably at a pressure of from about 1 to about 16 MPa.

The hydrogenation process of the present invention can be undertaken in a suitable reactor equipped with temperature regulator and agitator. According to the present invention, the double bond containing polymer can be made into particles which can be realized by any possible way, such as using normal cutting tools (scissors or knifes, etc.) or some special particle making processes (emulsion polymerization, or suspension polymerization, etc.).

According to the present invention the polymer particles can be mixed with the catalyst according to the designated ratio and fed into the reactors and degassed as required. The reactor can be pressurized with hydrogen. The hydrogenation temperature for the process of the present invention can be from about 35° C. to about 250° C., preferably from about 80° C. to about 160° C.

During the course of the hydrogenation reaction, hydrogen may be added to the reactor. The reaction time can be from about one quarter of an hour to about twenty four hours, preferably from about one half of an hour to about eight hours. The extent to which the carbon-carbon double bonds in the polymer are hydrogenated, i.e., the degree of hydrogenation, is from about 80 to about 99.5 percent, preferably from about 90 to about 99.5 percent. According to the present invention, when the hydrogenation reaction is complete, to the extent desired, the reaction vessel can be cooled and vented and the hydrogenated polymer is obtained.

The following examples with the experimental conditions shown in Table 1 illustrate the scope of the invention and are not intended to limit the same.

EXAMPLES

TABLE 1

Specification of the Materials

| Material | Supplier |
| --- | --- |
| Butadiene-acrylonitrile rubber (Krynac 3850), containing 62% butadiene | Bayer Inc. |
| RhCl(PPh$_3$)$_3$ | Synthesized according to literature procedures (Osborn, J. A.; Jardine, F. H.; Young, J. F.; Wilkinson, G., J. Chem. Soc. A. 1966, 1711-1732) |
| Triphenylphosphine (99%) | Strem Chemicals |
| Hydrogen (99.999%) | Praxair |
| Methyl ethyl ketone (99.8%) | Fisher Scientific |
| RhH(PPh$_3$)$_4$ | Synthesized according to literature procedures (Ahmad, N.; Levison, J. J.; Robinson, S. D.; Uttley, M. F., Inorg. Synth. 1974, 58-59). |
| Styrene/butadiene, ABA block copolymer, containing 28% styrene and 9.8% 1, 2 addition for butadiene | Aldrich |

TABLE 1-continued

Specification of the Materials

| Material | Supplier |
| --- | --- |
| Styrene/butadiene, ABA block copolymer, containing 24.5% styrene and 43.7% 1, 2 addition for butadiene | Sinopec Corp. |
| Polybutadiene, 36% cis, 55% trans and 9% 1, 2 addition | Aldrich |

Example 1

A 300 ml glass lined stainless steel autoclave having temperature control means, an agitator and hydrogen gas addition points was used. 0.6 gram of a butadiene-acrylonitrile polymer which had a bound acrylonitrile content of about 38 percent by weight and a Mooney viscosity (ML1+4 at 100 degree C.) of about 50 was used as bulk particles of 1-2 mm in diameter. 0.003 gram of the catalyst RhCl(PPh$_3$)$_3$ and 0.03 grams of triphenyl phosphine were used. Temperature of 145° C., and hydrogen pressure of 500 psi (3.4 MPa) were applied for 6 hours. After that the system was cooled down, the pressure was released and all of the polymer particles were taken out of the reactor and dissolved in methyl ethyl ketone and the degree of hydrogenation was determined by infra-red analysis of the hydrogenated polymer and confirmed by NMR. A 97.9 percent hydrogenation degree was achieved and no gel was generated in the hydrogenated polymer.

Example 2

The same procedures as described in Example 1 were employed, except that 3 hours of reaction time was applied. The hydrogenation degree was 89 percent and no gel was generated in the hydrogenated polymer.

Example 3

The same procedures as described in Example 1 were employed, except that 1 hour of reaction time and 160° C. of reaction temperature were applied. A 77.6 percent hydrogenation degree was achieved and no gel was generated in the hydrogenated polymer.

Example 4

The same procedures and conditions as described in Example 1 were employed, except that 7 hours of reaction time, 160° C. of reaction temperature, 550 psi (3.7 MPa) of hydrogen pressure and no triphenylphosphine were applied. A 96.5 percent hydrogenation degree was achieved and no gel was generated in the hydrogenated polymer.

Example 5

The same procedures and conditions as described in Example 4 were employed, except that 145° C. of reaction temperature was applied. A 93.2 percent hydrogenation degree was achieved and no gel was generated in the hydrogenated polymer.

Example 6

The same procedures and conditions as described in Example 1 were employed, except that 2 hours of reaction time, 0.001 gram of RhCl(PPh$_3$)$_3$ and 0.01 gram of triphenylphosphine were applied. A 60.0 percent hydrogenation degree was achieved and no gel was generated in the hydrogenated polymer.

Example 7

The same procedures and conditions as described in Example 1 were employed, except that 1 hour of reaction time and 0.001 gram of RhCl(PPh$_3$)$_3$ were applied. A 52.8 percent hydrogenation degree was achieved and no gel was generated in the hydrogenated polymer.

Example 8

The same procedures and conditions as described in Example 7 were employed, except that 0.01 gram of triphenylphosphine was applied. A 51 percent hydrogenation degree was achieved and no gel was generated in the hydrogenated polymer.

Example 9

The same procedures and conditions as described in Example 7 were employed, except that 0.005 gram of triphenylphosphine was applied. A 46.7 percent hydrogenation degree was achieved and no gel was generated in the hydrogenated polymer.

Example 10

The same procedures and conditions as described in Example 7 were employed, except that no triphenylphosphine was applied. A 32.0 percent hydrogenation degree was achieved and no gel was generated in the hydrogenated polymer.

Example 11

The same procedures and conditions as described in Example 8 were employed, except that 6 hours of reaction time was applied. A 75.1 percent hydrogenation degree was achieved and no gel was generated in the hydrogenated polymer.

Example 12

The same procedures and conditions as described in Example 3 were employed, except that 1500 psi of hydrogen pressure was applied. A 80.6 percent hydrogenation degree was achieved and no gel was generated in the hydrogenated polymer.

Example 13

The same procedures and conditions as described in Example 3 were employed, except that 200 psi of hydrogen pressure was applied. A 70.3 percent hydrogenation degree was achieved and no gel was generated in the hydrogenated polymer.

Example 14

The same procedures and conditions as described in Example 3 were employed, except that 100 psi of hydrogen pressure was applied. A 66.1 percent hydrogenation degree was achieved and no gel was generated in the hydrogenated polymer.

Example 15

The same procedures and conditions as described in Example 3 were employed, except that 145° C. of reaction temperature was applied. A 67.7 percent hydrogenation degree was achieved and no gel was generated in the hydrogenated polymer.

Example 16

The same procedures and conditions as described in Example 15 were employed, except that 1000 psi of hydrogen pressure was applied. A 76.0 percent hydrogenation degree was achieved and no gel was generated in the hydrogenated polymer.

Example 17

The same procedures and conditions as described in Example 15 were employed, except that 130° C. of reaction temperature was applied. A 54.9 percent hydrogenation degree was achieved and no gel was generated in the hydrogenated polymer.

Example 18

The same procedures and conditions as described in Example 15 were employed, except that 115° C. of reaction temperature was applied. A 35.7 percent hydrogenation degree was achieved and no gel was generated in the hydrogenated polymer.

Example 19

The same procedures and conditions as described in Example 8 were employed, except that 0.02 gram triphenylphosphine and 0.002 gram of RhCl(PPh$_3$)$_3$ were applied. A 59.2 percent hydrogenation degree was achieved and no gel was generated in the hydrogenated polymer.

Example 20

The same procedures and conditions as described in Example 8 were employed, except that 0.005 gram of triphenylphosphine and 0.0005 gram of RhCl(PPh$_3$)$_3$ were applied. A 27.0 percent hydrogenation degree was achieved and no gel was generated in the hydrogenated polymer.

Example 21

The same procedures and conditions as described in Example 4 were employed, except that 500 psi of hydrogen pressure and 6 hours of reaction time were applied. A 91.0 percent hydrogenation degree was achieved and no gel was generated in the hydrogenated polymer.

Example 22

The same procedures and conditions as described in Example 21 were employed, except that 0.0035 gram of RhCl(PPh$_3$)$_3$ and 170° C. of reaction temperature were applied. A 92.0 percent hydrogenation degree was achieved and no gel was generated in the hydrogenated polymer.

Example 23

The same procedures and conditions as described in Example 1 were employed, except that 0.0037 gram RhH(PPh$_3$)$_4$ and 160° C. of reaction temperature were applied. A 63.0 percent hydrogenation degree was achieved.

Example 24

The same procedures and conditions as described in Example 23 were employed, except that 145° C. of reaction temperature was applied. A 43.0 percent hydrogenation degree was achieved.

Example 25

The same procedures and conditions as described in Example 1 were employed, except that the bulk was used as a small piece of film. The thickness of the said film was of from about 0.05 to 0.3 mm, and the area of the said film was of from about 0.25 to 5 mm$^2$, and 1 hour of reaction time was applied. A 88.7 percent hydrogenation degree was achieved and no gel was generated in the hydrogenated polymer.

Example 26

The same procedures and conditions as described in Example 25 were employed, except that 3 hours of reaction time was applied. A 96.0 percent hydrogenation degree was achieved and no gel was generated in the hydrogenated polymer.

Example 27

The same procedures and conditions as described in Example 26 were employed, except that 0.01 gram of triphenylphosphine and 0.001 gram of RhCl(PPh$_3$)$_3$ were applied. A 75.0 percent hydrogenation degree was achieved and no gel was generated in the hydrogenated polymer.

Example 28

The same procedures and conditions as described in Example 26 were employed, except that 0.0003 gram of RhCl(PPh$_3$)$_3$ and 14 hours of reaction time were applied. A 72.0 percent hydrogenation degree was achieved and no gel was generated in the hydrogenated polymer.

Example 29

The same procedures and conditions as described in Example 28 were employed, except that 30 hours of reaction time was applied. A 87.0 percent hydrogenation degree was achieved and no gel was generated in the hydrogenated polymer.

Example 30

The same procedures and conditions as described in Example 27 were employed, except that 14 hours of reaction time was applied. A 97.0 percent hydrogenation degree was achieved and no gel was generated in the hydrogenated polymer.

Example 31

The same procedures and conditions as described in Example 1 were employed, except that polymer SBS (styrene/butadiene, ABA block copolymer) with a styrene content of 28 percent weight, and 9.8 percent 1, 2 addition for butadiene was used. The hydrogenation degree of the product was determined by NMR analysis. A 88.9 percent hydrogenation degree was achieved and no gel was generated in the hydrogenated polymer.

Example 32

The same procedures and conditions as described in Example 31 were employed, except that 3 hours of reaction time was applied. A 76.4 percent hydrogenation degree was achieved and no gel was generated in the hydrogenated polymer.

Example 33

The same procedures and conditions as described in Example 32 were employed, except that 1 hour of reaction time was applied. A 58.9 percent hydrogenation degree was achieved and no gel was generated in the hydrogenated polymer.

Example 34

The same procedures and conditions as described in Example 31 were employed, except that polymer SBS (styrene/butadiene, ABA block copolymer) with a styrene content of 24.5 percent by weight, and 43.7 percent by structure 1, 2 addition for butadiene was used. A 94.7 percent hydrogenation degree was achieved and no gel was generated in the hydrogenated polymer.

Example 35

The same procedures and conditions as described in Example 34 were employed, except that 3 hours of reaction time was applied. A 92.2 percent hydrogenation degree was achieved and no gel was generated in the hydrogenated polymer.

Example 36

The same procedures and conditions as described in Example 35 were employed, except that 1 hour of reaction time was applied. A 78.5 percent hydrogenation degree was achieved and no gel was generated in the hydrogenated polymer.

Example 37

The same procedures and conditions as described in Example 34 were employed, except that the polymer polybutadiene (36 percent cis, 55 percent trans and 9 percent 1,2 addition) was applied. A 99.2 percent hydrogenation degree was achieved and no gel was generated in the hydrogenated polymer.

Example 38

The same procedures and conditions as described in Example 37 were employed, except that 3 hours of reaction time was applied. A 80.1 percent hydrogenation degree was achieved and no gel was generated in the hydrogenated polymer.

Example 39

The same procedures and conditions as described in Example 38 were employed, except that 1 hour of reaction time was applied. A 43.0 percent hydrogenation degree was achieved and no gel was generated in the hydrogenated polymer.

A summary of the degrees of hydrogenation for NBR, SBS and PBD as well as experimental conditions are provided in Table 2. The results clearly show that under a number of operating conditions that it is possible to achieve a degree of hydrogenation in excess of 90 percent of gel free hydrogenated polymer without any need of addition of any organic solvent. For all the examples when the catalyst $RhCl(PPh_3)_3$ loading is greater than 0.45 percent by weight based on the polymers and temperature is higher than 144° C. and time of reaction is longer than 6 hours, higher than 90 percent hydrogenation degrees were achieved except in example 31 where the degree of hydrogenation is 88.9 percent.

TABLE 2

Summary of Examples 1 through 39

| Example # | Polymer | $W_{polymer}$ (g) | Catalyst | Wcat g | $W_{TPP}$ g | T ° C. | P psi | t hrs | HD % |
|---|---|---|---|---|---|---|---|---|---|
| 1 | NBR | 0.6 | $RhCl(PPh_3)_3$ | 0.003 | 0.03 | 145 | 500 | 6 | 97.9 |
| 2 | NBR | 0.6 | $RhCl(PPh_3)_3$ | 0.003 | 0.03 | 145 | 500 | 3 | 89 |
| 3 | NBR | 0.6 | $RhCl(PPh_3)_3$ | 0.003 | 0.03 | 160 | 500 | 1 | 77.6 |
| 4 | NBR | 0.6 | $RhCl(PPh_3)_3$ | 0.003 | 0 | 160 | 550 | 7 | 96.5 |
| 5 | NBR | 0.6 | $RhCl(PPh_3)_3$ | 0.003 | 0 | 145 | 550 | 7 | 93.2 |
| 6 | NBR | 0.6 | $RhCl(PPh_3)_3$ | 0.001 | 0.01 | 145 | 500 | 2 | 60.0 |
| 7 | NBR | 0.6 | $RhCl(PPh_3)_3$ | 0.001 | 0.03 | 145 | 500 | 1 | 52.8 |
| 8 | NBR | 0.6 | $RhCl(PPh_3)_3$ | 0.001 | 0.01 | 145 | 500 | 1 | 51 |
| 9 | NBR | 0.6 | $RhCl(PPh_3)_3$ | 0.001 | 0.005 | 145 | 500 | 1 | 46.7 |
| 10 | NBR | 0.6 | $RhCl(PPh_3)_3$ | 0.001 | 0 | 145 | 500 | 1 | 32.0 |
| 11 | NBR | 0.6 | $RhCl(PPh_3)_3$ | 0.001 | 0.01 | 145 | 500 | 6 | 75.1 |
| 12 | NBR | 0.6 | $RhCl(PPh_3)_3$ | 0.003 | 0.03 | 160 | 1500 | 1 | 80.6 |
| 13 | NBR | 0.6 | $RhCl(PPh_3)_3$ | 0.003 | 0.03 | 160 | 200 | 1 | 70.3 |
| 14 | NBR | 0.6 | $RhCl(PPh_3)_3$ | 0.003 | 0.03 | 160 | 100 | 1 | 66.1 |
| 15 | NBR | 0.6 | $RhCl(PPh_3)_3$ | 0.003 | 0.03 | 145 | 500 | 1 | 67.7 |
| 16 | NBR | 0.6 | $RhCl(PPh_3)_3$ | 0.003 | 0.03 | 145 | 1000 | 1 | 76.0 |
| 17 | NBR | 0.6 | $RhCl(PPh_3)_3$ | 0.003 | 0.03 | 130 | 500 | 1 | 54.9 |
| 18 | NBR | 0.6 | $RhCl(PPh_3)_3$ | 0.003 | 0.03 | 115 | 500 | 1 | 35.7 |
| 19 | NBR | 0.6 | $RhCl(PPh_3)_3$ | 0.002 | 0.02 | 145 | 500 | 1 | 59.2 |
| 20 | NBR | 0.6 | $RhCl(PPh_3)_3$ | 0.0005 | 0.005 | 145 | 500 | 1 | 27.0 |
| 21 | NBR | 0.6 | $RhCl(PPh_3)_3$ | 0.003 | 0 | 160 | 500 | 6 | 91.0 |
| 22 | NBR | 0.6 | $RhCl(PPh_3)_3$ | 0.0035 | 0 | 170 | 500 | 6 | 92.0 |
| 23 | NBR | 0.6 | $RhH(PPh_3)_4$ | 0.0037 | 0.03 | 160 | 500 | 6 | 63.0 |
| 24 | NBR | 0.6 | $RhH(PPh_3)_4$ | 0.0037 | 0.03 | 145 | 500 | 6 | 43.0 |
| 25 | NBR | 0.6 | $RhCl(PPh_3)_3$ | 0.003 | 0.03 | 145 | 500 | 1 | 88.7 |
| 26 | NBR | 0.6 | $RhCl(PPh_3)_3$ | 0.003 | 0.03 | 145 | 500 | 3 | 96.0 |
| 27 | NBR | 0.6 | $RhCl(PPh_3)_3$ | 0.001 | 0.01 | 145 | 500 | 3 | 75.0 |
| 28 | NBR | 0.6 | $RhCl(PPh_3)_3$ | 0.0003 | 0.01 | 145 | 500 | 14 | 72.0 |
| 29 | NBR | 0.6 | $RhCl(PPh_3)_3$ | 0.0003 | 0.01 | 145 | 500 | 30 | 87.0 |
| 30 | NBR | 0.6 | $RhCl(PPh_3)_3$ | 0.001 | 0.01 | 145 | 500 | 14 | 97.0 |
| 31 | SBS[1] | 0.6 | $RhCl(PPh_3)_3$ | 0.003 | 0.03 | 145 | 500 | 6 | 88.9 |
| 32 | SBS[1] | 0.6 | $RhCl(PPh_3)_3$ | 0.003 | 0.03 | 145 | 500 | 3 | 76.4 |
| 33 | SBS[1] | 0.6 | $RhCl(PPh_3)_3$ | 0.003 | 0.03 | 145 | 500 | 1 | 58.9 |
| 34 | SBS[2] | 0.6 | $RhCl(PPh_3)_3$ | 0.003 | 0.03 | 145 | 500 | 6 | 94.7 |
| 35 | SBS[2] | 0.6 | $RhCl(PPh_3)_3$ | 0.003 | 0.03 | 145 | 500 | 3 | 92.2 |
| 36 | SBS[2] | 0.6 | $RhCl(PPh_3)_3$ | 0.003 | 0.03 | 145 | 500 | 1 | 78.5 |
| 37 | PBD | 0.6 | $RhCl(PPh_3)_3$ | 0.003 | 0.03 | 145 | 500 | 6 | 99.2 |
| 38 | PBD | 0.6 | $RhCl(PPh_3)_3$ | 0.003 | 0.03 | 145 | 500 | 3 | 80.1 |
| 39 | PBD | 0.6 | $RhCl(PPh_3)_3$ | 0.003 | 0.03 | 145 | 500 | 1 | 43.0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A process for the hydrogenation of carbon-carbon double bonds of a polymer in bulk form comprised of a conjugated diene and, optionally additional co-polymerizable monomer(s), comprising, hydrogenating a polymer at a temperature of from about 35° C. to about 250° C., and a hydrogen pressure of from about 0.1 to about 20 MPa, in the presence of a catalyst having the formula $$RhQL_X$$

wherein Q is hydrogen or an anion, wherein L is a ligand compound of the formula $R_mB$, or $R_mB(CH_2)_nBR_m$, wherein R is a $C_1$-$C_8$-alkyl group, a $C_4$-$C_8$-cycloalkyl group, a $C_6$-$C_{15}$-aryl group or a $C_7$-$C_{15}$-arylalkyl group, B is phosphorus, arsenic, sulfur, or a sulphoxide group, wherein m is 2 or 3, n is 2, 3, or 4, and wherein x is 2, 3 or 4, and wherein the process is carried out in the absence of an organic solvent at any stage.

2. The process of claim 1, further including the presence of a co-catalyst of the formula L, wherein L is a ligand compound of the formula $R_mB$, wherein R is a $C_1$-$C_8$-alkyl group, a $C_4$-$C_8$-cycloalkyl group, a $C_6$-$C_{15}$-aryl group or a $C_7$-$C_{15}$-aralkyl group, B is phosphorus, arsenic, sulfur, or a sulphoxide group.

3. The process of claim 1 wherein the conjugated diene is selected from butadiene and isoprene.

4. The process of claim 1, wherein the optionally additional copolymerizable monomer is selected from styrene and alpha methyl styrene.

5. The process of claim 1, wherein the optionally additional copolymerizable monomer is selected from acrylonitrile and methacrylonitrile.

6. The process of claim 1, wherein the optionally additional copolymerizable monomer is acrylonitrile and an unsaturated carboxylic acid selected from fumaric acid, maleic acid, acrylic acid and methacrylic acid.

7. The process of claim 1, wherein the optionally additional copolymerizable monomer is acrylonitrile and one of propyl acrylate, butyl acrylate, propyl methacrylate and butyl methacrylate.

8. The process of claim 2, wherein the catalyst is present at from about 0.01 to 5 weight percent, based on the weight of the polymer, and the co-catalyst is present at from 0-5000 percent by weight based on the weight of the catalyst.

9. The process of claim 1, wherein x is 3, Q is a halogen.

10. The process of claim 1, wherein x is 4 and Q is hydrogen.

11. The process of claim 1, wherein the catalyst is selected from the group consisting of tris-(triphenylphosphine)-rhodium(1)-chloride, tris(triphenylphosphine)-rhodium(III)-chloride and tris-(dimethylsulphoxide)-rhodium(III)-chloride, and tetrakis-(triphenylphosphine)-rhodium hydride.

* * * * *